US007332223B2

(12) United States Patent
Sotzing et al.

(10) Patent No.: US 7,332,223 B2
(45) Date of Patent: *Feb. 19, 2008

(54) POLYMERS COMPRISING THIENO [3,4-B]THIOPHENE AND METHODS OF MAKING AND USING THE SAME

(75) Inventors: Gregory A. Sotzing, Storrs, CT (US); Francis Joseph Waller, Allentown, PA (US); Lloyd Mahlon Robeson, Macungie, PA (US)

(73) Assignee: University of Connecticut, Storrs, CT (US)

( * ) Notice: Subject to any disclaimer, the term of this patent is extended or adjusted under 35 U.S.C. 154(b) by 15 days.

This patent is subject to a terminal disclaimer.

(21) Appl. No.: 11/394,906

(22) Filed: Mar. 31, 2006

(65) Prior Publication Data

US 2006/0241279 A1 Oct. 26, 2006

Related U.S. Application Data

(63) Continuation of application No. 10/193,598, filed on Jul. 11, 2002, now Pat. No. 7,071,289.

(51) Int. Cl.
*B32B 27/06* (2006.01)
*C08G 75/00* (2006.01)

(52) U.S. Cl. ...................... 428/419; 528/377; 528/373; 528/482; 528/486; 528/499; 528/503; 525/535; 524/82; 524/84

(58) Field of Classification Search ................ 528/377, 528/373, 482, 486, 499, 503; 525/535; 524/82, 524/84; 428/419

See application file for complete search history.

(56) References Cited

U.S. PATENT DOCUMENTS

| | | | |
|---|---|---|---|
| 4,639,328 A | 1/1987 | Krause et al. | |
| 4,663,001 A | 5/1987 | Lazzaroni et al. | |
| 4,711,742 A | 12/1987 | Jen et al. | |
| 4,910,645 A | 3/1990 | Jonas et al. | 361/525 |
| 4,959,430 A | 9/1990 | Jonas et al. | 526/257 |
| 5,109,070 A | 4/1992 | Epstein et al. | 525/189 |
| 5,300,575 A | 4/1994 | Jonas et al. | 525/186 |
| 5,691,062 A | 11/1997 | Shalaby et al. | 428/411.1 |
| 6,194,540 B1 | 2/2001 | Ito et al. | 528/373 |
| 6,242,561 B1 | 6/2001 | Mohwald et al. | 528/377 |
| 6,294,245 B1 | 9/2001 | Roitman et al. | 428/212 |
| 6,585,914 B2 | 7/2003 | Marks et al. | |
| 6,645,401 B2 | 11/2003 | Giles et al. | |
| 6,676,857 B2 | 1/2004 | Heeney et al. | |
| 6,695,978 B2 | 2/2004 | Worrall et al. | |
| 6,709,808 B2 | 3/2004 | Lelental et al. | |
| 6,800,155 B2 | 10/2004 | Senecal | |
| 7,060,846 B2 | 6/2006 | Zahn et al. | |
| 7,071,289 B2 | 7/2006 | Sotzing | |
| 7,105,237 B2 | 9/2006 | Sotzing | |
| 7,118,692 B2 | 10/2006 | Nordquist et al. | |
| 7,125,479 B2 | 10/2006 | Sotzing | |
| 7,241,904 B2 | 7/2007 | Zahn et al. | |
| 2001/0045547 A1 | 11/2001 | Senecal et al. | |
| 2002/0011420 A1 | 1/2002 | Roitman et al. | 205/419 |
| 2004/0074779 A1 | 4/2004 | Sotzing | |
| 2005/0124784 A1 | 6/2005 | Sotzing | |
| 2005/0209419 A1 | 9/2005 | Zahn et al. | |
| 2006/0147616 A1 | 7/2006 | Gaudiana et al. | |
| 2006/0223977 A1 | 10/2006 | Zahn et al. | |

FOREIGN PATENT DOCUMENTS

| | | |
|---|---|---|
| EP | 0 999 242 A1 | 5/2000 |
| WO | WO 91/06887 | 5/1991 |

OTHER PUBLICATIONS

A. Bongini, et al., "New n-Dopable Thiophene Based Polymers", Synthetic Metals 101 (1999) pp. 13-14.
J. Eldo, et al., "New Low Band Gap Polymers: Control of Optical and Electronic Properties in near Infrared Absorbing Pi-Conjugated Polysquaraines", Chemistry Materials, 2002, 14, pp. 410-418.
Xiaomin Gu, "Part I: Syntheses and Characterization of Poly (2-Decylthieon[3,4-b]Thiophene), A Low Bandgap Conducting Polymer Part II: Formation and Trapping of Methoxy (Methoxy-Carbonyl) Ketene" Dissertation, Dec. 1995, 182 pages. The University of Texas at Arlington.
B. Lee, et al., "Agueous Phase Polymerization of Thieno[3,4-b] Thiophene", Polymer Preprints 2002, 43(2) pp. 568-569.
K. Lee, et al., "Poly(thieno[3,4-b]thiophene). A New Stable Low Band Gap Conducting Polymer", Macromolecules 2001, 34, pp. 5746-5747.

(Continued)

*Primary Examiner*—Duc Truong
(74) *Attorney, Agent, or Firm*—Cantor Colburn LLP

(57) ABSTRACT

This invention presents polymers and copolymers comprising repeating units of thieno[3,4-b]thiophene. Water-borne dispersions of such polymers and copolymers can be cast by conventional methods to provide uniform, thin films which possess utility in numerous electroactive applications including electrochromic displays, optically transparent electrodes and antistatic coatings. The compositions of this invention can be doped with conventional p-dopants or n-dopants. The invention also presents an aqueous process for preparing such compositions of matter.

32 Claims, No Drawings

OTHER PUBLICATIONS

K. Lee, et al., "Thieno[3,4-b]thiophene as a Novel Low Oxidation Crosslinking Agent", Polymeric Materials: Science and Engineering 2002, 86, p. 195.

K. Lee, et al., "Toward the Use of Poly(Thieno[3,4-b]Thiophene) in Optoelectronic Devices", Polymer Preprints 2002, 43(2), pp. 610-611.

D. C. Loveday, et al., "Synthesis and Characterization of p- and n-Dopable Polymers. Electrochromic Properties of Poly 3-(p-trimethylammoniumphenyl)bithiophene", Synthetic Metals 84 (1997) pp. 245-246.

H. Meng, et al., "A Robust Low Band Gap Processable n-Type Conducting Polymer Based on Poly(isothianaphthene)", Macromolecules 2001, 34, pp. 1810-1816.

C. J. Neef, et al., "Synthesis and Electronic Properties of Poly(2-phenylthieno[3,4-b]thiophene): A New Low Band Gap Polymer", Chemistry Materials 1999, 11, pp. 1957-1958.

M. Pomerantz, et al., "Poly(2-decylthieno[3,4-b]thiophene-4,6-diyl). A New Low Band Gap Conducting Polymer", Macromolecules 2001, 34, pp. 1817-1822.

V. Seshadri, et al., "Ion Transport Behavior of Polymers and Copolymers Containing Thieno[3,4-b]Thiophene", Polymer Preprints 2002, 43(2), pp. 584-585.

G. A. Sotzing, et al., "Intrinsically Conducting Polymers and Green Chemistry", Polymer Preprints 2002, 43(2), pp. 904-905.

G. A. Sotzing, et al., "Poly(thieno[3,4-b]thiophene) as a Low Band Gap Conducting Polymer and Electrochemical Material", Polymeric Materials: Science and Engineering 2001, 85, pp. 604-605.

G. A. Sotzing, et al., "Preparation and Characterization of Fully Conjugated Intrinsically Conducting Polymer Networks", Polymeric Materials: Science and Engineering 2002, 86, pp. 40-41.

K. Lee, et al., "Synthesis of poly(thieno[3,4-b]thiophene) and its electrochemical characterizations", Polymer Preprints 2001, 42(2), pp. 413-414.

H. Wynberg, et al., "Thieno[3,4-b]Thiophene. The Third Thiophthene", Pergamon Press Ltd, 1967, Tetrahedron Letters No. 9, pp. 761-764.

M. Pomerantz, et al., "Poly(2-decylthieno[3,4-b]thiophene). A New Soluble Low-Bandgap Conducting Polymer", Synthetic Metals 84 (1997), pp. 243-244.

C. J. Neef, et al., "Synthesis and Electronic Properties of Poly(2-Phenylthienoo[3,4-b]Thiophene)", Polymer Preprints 1998, 39(1), pp. 147-148.

Lee, et al; Synthesis and Characterization of a Soluble and Transparent Conducting Polymer, Poly(3,4-ethylenedioxythiophene); Molecular Crystans and Liquid Crystals Science and Technology; 327; pp. 237-240; (1999).

Neef et al; "Synthesis and Electronic Properties of Poly(2-phenylthieno[3,4-b]thiophene)"; American Chemical Society; 131; 214964; (1999).

Neef et al; "Synthesis and Electronic Properties of Poly(2-phenylthieno[3,4-b]thiophene)", American Chemical Society; 128; 230943; (1998).

Pomerantz et al; "A New Soluble Low-Bandgap Conducting Polymer"; Elsevier; 126; 293709; (1997).

Gu; "Synthesis and Characterization of Poly(2-decylthieno(3,4-b)thiophene)"; Chem Abstract; 125; 87896;; (1996).

Song Y. Hong et al., "Understanding the Conformational Stability and Electronic Structures of Modified Polymers Based on Polythiopene", Micromolecules 1992, pp. 4652-4657.

POLYMERS COMPRISING THIENO [3,4-B]THIOPHENE AND METHODS OF MAKING AND USING THE SAME

CROSS REFERENCE TO RELATED APPLICATIONS

This application is a continuation of application Ser. No. 10/193,598 filed Jul. 11, 2002, now U.S. Pat. No. 7,071,289, which is incorporated herein in its entirety.

FIELD OF INVENTION

This invention relates to compositions of matter, more particularly, polymers comprising polymerized units of thieno[3,4-b]thiophene, methods of producing such compositions of matter, and to applications which utilize such compositions of matter. The compositions of matter according to this invention can be utilized in a variety of industrial applications including electrochromic displays, optically transparent electrodes and antistatic coatings.

BACKGROUND OF THE INVENTION

Polymers formed from polymerized units of thiophene and substituted thiophene monomers which possess relatively low band gaps (Eg) demonstrate measurable electrical conductivity. Such polymers are often referred to as intrinsically conducting polymers. The term, band gap (Eg), refers to the energy difference between electronic energy levels called the conduction band and the valence band. The band gap exhibited by a given polymer depends upon a variety of factors including the structure of the monomer making up the polymer. For example, polythiophene demonstrates a band gap of 2.1 eV, poly (2-decylthieno[3,4-b]thiophene) demonstrates a band gap of 0.92 eV and poly(2-phenylthieno[3,4-b]thiophene) demonstrates a band gap of 0.85 eV.

Intrinsically conducting polymers consisting solely of aromatic repeat units in the polymer backbone are typically not soluble in water. Consequently, such polymers are typically processed using organic solvents. Several methods have been employed to increase the solubility of intrinsically conducting polymers in various organic solvents. Such methods include (1) forming a derivative of the monomer to increase the solubility of the side chains of the monomer in a given organic solvent; (2) modifying the polymer backbone by employing oligomeric conjugated systems and flexible spacers; and (3) using charge compensating dopants.

U.S. Pat. No. 5,300,575 (the '575 Patent) discloses dispersions of polythiophenes which are suitable for use as antistatic coatings for plastic moldings. These polythiophenes are prepared by polymerizing the corresponding monomer in the presence of oxidizing agents typically used for the oxidative polymerization of pyrrole and/or with oxygen or air in the presence of a polyanion. The polythiophenes of the '575 Patent have a relatively low Eg of 1.7 eV compared to poly(thiophene) which has an Eg of 2.1 eV.

The polythiophenes of the '575 Patent are typically prepared by polymerizing 3,4-ethylenedioxythiophene in the presence of poly(styrene sulfonic acid). The resulting linear polymer is purified using both anion and cation exchange resins wherein poly(styrene sulfonate) serves as a charge compensating dopant. The resulting polymer forms a colloidal dispersion in water because poly(styrene sulfonate) is soluble in water and demonstrates a strong ionic interaction with the cationic polymeric backbone.

Those skilled in the art to which this invention pertains continue to search for intrinsically conducting polymers which exhibit useful bandgaps for industrial applications, which can be readily dispersed in water and which are stable in solution to afford a useful shelf life.

BRIEF SUMMARY OF THE INVENTION

This invention presents compositions of matter formed from polymerized units of thieno[3,4-b]thiophene. More particularly, such compositions of matter are polymers comprising repeating units of thieno[3,4-b]thiophene.

Applicants' have unexpectedly discovered that the compositions of matter of the present invention can be prepared as water-borne dispersions. The water dispersible character of the compositions of matter of this invention is unexpected because thieno[3,4-b]thiophene can polymerize via chain extension at (the three open positions $\partial$ to sulfur in the two fused thiophene rings) thieno[3,4-b]thiophene.

One of ordinary skill in the art to which this invention pertains would expect polymerization of thieno[3,4-b]thiophene to yield a crosslinked polymer which would not be capable of forming an aqueous dispersible film or would expect the resulting polymer to possess gel particles which would lead to a non-uniform film upon casting and drying.

Applicants have discovered that aqueous dispersions comprising the claimed compositions are easily prepared, readily storable and eliminate environmental problems associated with use of dispersions formed from organic solvents. Water-borne dispersions of the compositions of matter of this invention can be cast by conventional methods to provide uniform, thin films which possess utility in numerous applications including electrochromic displays, optically transparent electrodes and antistatic coatings.

Thus, the polymers of this invention comprise polymerized units of thieno[3,4-b]thiophene. A preferred polymer consists of poly(thieno[3,4-b]thiophene). The polymers of this invention may further comprise polymerized units of an electroactive monomer. Preferred electroactive monomers are selected from the group consisting of thiophene, substituted thiophenes, substituted thieno[3,4-b]thiophenes, dithieno[3,4-b:3',4'-d]thiophene, pyrrole, bithiophene, substituted pyrroles, phenylene, substituted phenylenes, naphthalene, substituted naphthalenes, biphenyl and terphenyl, substituted terphenyl, phenylene vinylene and substituted phenylene vinylene. The polymers of this invention may further comprise polymerized units of a non-electroactive monomer.

Preferred substituted thieno[3,4-b]thiophenes to be incorporated into the polymers of the present invention to form a copolymer are represented by the formula:

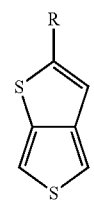

wherein R=$C_1$ to $C_{12}$ primary, secondary or tertiary alkyl group, phenyl, substituted phenyl, cyclohexyl, naphthalenic, hydroxyl, alkyl ether, carboxylic acid, carboxylic ester and a sulfonic acid.

Preferred substituted thiophenes to be incorporated into the polymers of the present invention to form a copolymer are represented by the formula:

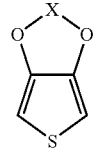

where x denotes a substituted $C_1$-$C_4$ alkyl group, a $C_1$-$C_{12}$ alkyl or phenyl substituted 1,2 ethylene radical or a 1,2 cyclohexylene radical.

Additional preferred substituted thiophenes to be incorporated into the polymers of the present invention to form a copolymer are represented by the formula:

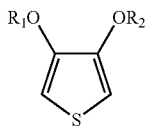

wherein $R_1$ and $R_2$ are independently selected from the group consisting of H, $C_1$-$C_4$ alkyl groups, 1,2 cyclohexylene radical, phenyl substituted phenyl and the like.

The polymer of the present invention comprising polymerized units of thieno[3,4-b]thiophene may further comprise an oligomer comprising thieno[3,4-b]thiophene which is end group functionalized, polymerized units of 3,4-ethylenedioxythiophene and polymerized units of pyrrole.

The polymers of this invention can be doped with conventional p-dopants or n-dopants to modify the electrical properties of such polymers.

Applicants also disclose a process for preparing polymers comprising polymerized units of thieno[3,4-b]thiophene comprising the steps of reacting thieno[3,4-b]thiophene in the presence of water, a polyanion and an oxidant under reactions conditions sufficient to form the polymer comprising polymerized units of thieno[3,4-b]thiophene. Preferred reaction conditions comprise a time period ranging from 5 minutes to 48 hours and a temperature ranging from 0° C. to 50° C.

Preferred polyanions are selected from the group consisting of polyacrylic acid, polymethacrylic acid, NAFION, a perfluorosulfonic acid polymer (NAFION is a registered trademark of E.I. DuPont de Nemours & Co., Wilmington, Del.), polymaleic acid, polystyrene sulfonic acid and polyvinyl sulfonic acid. Preferred oxidants are selected from the group consisting of $FeCl_3$, $Fe(ClO_4)_3$, $H_2O_2$, $K_2Cr_2O_7$, ammonium persulfate, potassium permanganate, copper tetrafluoroborate, iodine, air and oxygen.

DETAILED DESCRIPTION OF THE INVENTION

This invention presents compositions of matter which include polymerized units of thieno[3,4-b]thiophene. More particularly, such compositions of matter include polymers, copolymers and oligomers comprising polymerized units of thieno[3,4-b]thiophene. These compositions of matter can be prepared to exhibit a variety of properties desired for numerous end-use applications.

I. Definitions

For purposes of interpreting the Specification and appended Claims, the following terms shall be given the meaning set forth below:

The term, polymer, shall mean a composition of matter having at least five polymerized units of thieno[3,4-b]thiophene. Thus, the term, polymer, includes copolymers and oligomers having at least five polymerized units of thieno[3,4-b]thiophene.

The term, substrate, shall mean a solid material (which may be flexible or rigid) suitable for deposition of the compositions of matter according to this invention. Substrates can be formed of materials including, but not limited to glass, organic polymers, plastic, silicon, minerals, semiconducting materials, ceramics, metals and the like. The substrate may be inherently conductive.

The term, electroactive monomer, shall mean a monomer which is capable of polymerization or copolymerization resulting in a polymer having electrical/electronic properties such as electrical conductivity, semiconductivity, electroluminescence, electrochromicity or photovoltaic properties.

The term, non-electroactive monomer, shall mean a monomer which is capable of polymerization or copolymerization which does not exhibit the properties set forth under the definition of electroactive monomer.

The term, band gap, shall mean the energy difference between electronic energy levels called the conduction band and the valence band.

The term, substituted, as used with respect to a composition of matter, shall mean an electron-rich or electron deficient group appended to such composition of matter. Preferred substituents include, but are not limited to, H, hydroxyl, aryl, phenyl, cycloalkyl, alkyl, halogen, alkoxy, alkylthio, perfluoroalkyl, perfluoroaryl, pyridyl, cyano, thiocyanato, nitro, amino, alkylamino, acyl, sulfoxyl, sulfonyl, amido, and carbamoyl.

The term, aryl, shall mean a compound having the ring structure characteristic of benzene, naphthalene, phenanthrene, anthracene, etc. (i.e., either the 6-carbon ring of benzene or the condensed 6-carbon rings of the other aromatic derivatives). For example, an aryl group may be phenyl ($C_6H_5$) or naphthyl ($C_{10}H_7$). The aryl group, while a substituent can itself have additional substituents (e.g. the substituents disclosed under this definition).

The term, alkyl, shall mean a paraffinic hydrocarbon group which may be derived from an alkane by dropping one hydrogen from the formula. Examples are methyl ($CH_3$—), ethyl $C_2H_5$—), propyl ($CH_3CH_2CH_2$—), isopropyl (($CH_3)_2CH$—).

The term, halogen, shall mean one of the electronegative elements of group VIIA of the periodic table (fluorine, chlorine, bromine and iodine).

The term, perfluoroalkyl, shall mean an alkyl group in which every hydrogen atom is replaced by a fluorine atom.

The term, perfluoroaryl, shall mean an aryl group in which every hydrogen atom is replaced by a fluorine atom.

The term, sulfoxyl, shall mean a group of composition RS(O)— where R is an alkyl, aryl, cycloalkyl, perfluoroalkyl or perfluoroaryl group. Examples include, but are not limited to methylsulfoxyl, phenylsulfoxyl, and the like.

The term, sulfonyl, shall mean a group of composition $RSO_2$— where R is an alkyl, aryl, cycloalkyl, perfluoroalkyl, or perfluoroaryl group. Examples include, but are not limited to methylsulfonyl, phenylsulfonyl, p-toluenesulfonyl, and the like.

The term, acyl, shall mean an organic acid group in which the —OH of the carboxyl group is replaced by another substituent (RCO—). Examples include, but are not limited to acetyl, benzoyl, and the like.

II. Description

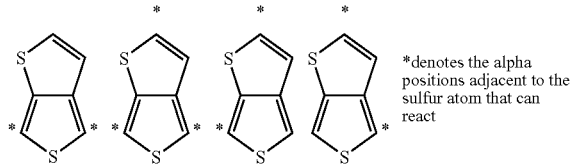

*denotes the alpha positions adjacent to the sulfur atom that can react

The monomer, thieno[3,4-b]thiophene, has three alpha positions adjacent to the respective two sulfur atoms of the monomer. The polymers of this invention (which by the definition presented above, includes copolymers and oligomers) can be propagated to form polymerized units by effecting reaction at the alpha positions (represented by an asterisk) of the monomer depicted in the following formulae: The reactive alpha positions of thieno[3,4-b]thiophene monomer can react with additional thieno[3,4-b]thiophene monomers to form a homopolymer of polymerized units or can react with one or more additional electroactive monomers or non-electroactive monomers to form copolymers, including random copolymers, graft copolymers, block copolymers, and dendritic structures.

A preferred embodiment of the present invention is a homopolymer formed by polymerizing thieno[3,4-b]thiophene. Thus, each thieno[3,4-b]thiophene of the resulting polymer constitutes a polymerizable unit. The homopolymer is referred to as poly(thieno[3,4-b]thiophene).

Electroactive monomers suitable for incorporation into the polymers of this invention to form copolymers include those monomers known in the art which exhibit electroactivity, including but not limited to thiophene, substituted thiophenes, substituted thieno[3,4-b]thiophenes, dithieno[3,4-b:3',4'-d]thiophene, pyrrole, bithiophene, substituted pyrroles, phenylene, substituted phenylenes, naphthalene, substituted naphthalenes, biphenyl and terphenyl and their substituted versions, phenylene vinylene and substituted phenylene vinylene.

Suitable substituted thieno[3,4-b]thiophenes for incorporation into the polymers of the present invention to form copolymers are represented by the formula:

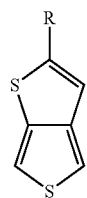

wherein R=$C_1$ to $C_{12}$ primary, secondary or tertiary alkyl groups, phenyl and substituted phenyl groups, cyclohexyl, naphthalenic, hydroxyl, alkyl ether, carboxylic acids, esters and sulfonic acid groups.

Suitable substituted thiophenes for incorporation into the polymers of the present invention to form copolymers include the following substituted thiophenes described in U.S. Pat. No. 4,959,430:

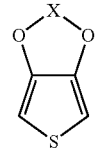

Where x denotes a substituted $C_1$-$C_4$ alkyl group, a $C_1$-$C_{12}$ alkyl or phenyl substituted 1,2 ethylene radical or a 1,2 cyclohexylene radical. Optionally, the alkyl or phenyl groups can be further substituted with functional groups such as hydroxyls, ethers and the like.

Additional substituted thiophenes for incorporation into the polymers of the present invention to form copolymers include the following substituted thiophenes presented in U.S. Pat. No. 4,910,645:

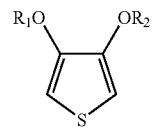

wherein $R_1$ and $R_2$ are independently selected from the group consisting of H, $C_1$-$C_4$ alkyl groups, 1,2 cyclohexylene radical and phenyl substituted phenyl.

The compositions of matter according to this invention also contemplate oligomers comprising thieno[3,4-b]thiophene and substituted thieno[3,4-b]thiophene monomers which are endgroup functionalized and incorporated into either block copolymers or coupled with difunctional reactants known in the art (as an example hydroxyl endgroups could be coupled with diisocyanates or acid chlorides). Such oligomers provide a convenient method for controlling the conjugation length of the compositions of matter of this invention. The conjugation length in the oligomeric structure can be varied to achieve desired properties for a variety of applications.

The compositions of matter of the present invention may also include repeating units of non-electroactive monomers which are capable of being polymerized with thieno[3,4-b]thiophene provided that the presence of such non-electroactive monomers does not adversely affect the electroactive properties of the resulting composition of matter.

The compositions of matter of this invention can be utilized as dispersions by combining a desired polymer (including copolymers and oligomers) with water, a mixture of a water-miscible organic solvent or an organic solvent.

Dispersions containing the compositions of matter according to this invention can be applied via conventional processes including ink jet printing, screen printing, roll to roll printing processes, spin coating, meniscus and dip coating, spray coating, brush coating, doctor blade application, curtain casting and the like.

The amount of polymer (including copolymers and oligomers) to be incorporated into the solution or dispersion shall vary depending upon a variety of factors including the molecular weight of the composition of matter and the end-use application. The actual amount of composition of matter to be introduced into the dispersion is readily determined without undue experimentation.

The dispersed films may be dried by conventional techniques including evaporation to remove the solvent to provide the desired film. Drying may be effected at room temperature or any temperature which does not adversely affect the properties of the resulting film. However, to obtain higher processing speeds, the film can be dried at elevated temperatures provided that such temperatures do not adversely affect the properties of the resulting film.

The compositions of matter of this invention can be utilized in a variety of conventional applications including antistatic coatings, electrically conductive coatings, electrochromic devices, photovoltaic devices, light emitting diodes, flat panel displays, photoimageable circuits, printable circuits, thin film transistor devices, batteries, electrical switches, capacitor coatings, corrosion resistant coatings, electromagnetic shielding, sensors, LED lighting and the like. The electrical conductivity of the compositions of matter according to the present invention can be readily modified, if necessary, to meet the requirements of any of the previously mentioned application by doping these compositions of matter with conventional acidic dopants (p-dopants) and basic dopants (n-dopants) known in the art.

Suitable p-dopants include mineral acids such as HCl, $HNO_3$, $H_2SO_4$, $H_3PO_4$, HBr, HI; organic sulfonic acids such as dodecyl benzene sulfonic acid, lauryl sulfonic acid, camphor sulfonic acid, organic acid dyes, methane sulfonic acid, toluene sulfonic acid, polymeric sulfonic acids such as poly(styrene sulfonic acid) and copolymers; carboxylic acids such as adipic acid, azelaic acid, oxalic acid, and polymeric polycarboxylic acids such as poly(acrylic acid) poly(maleic acid), poly(methacrylic acid) and copolymers containing these acids. Conventional mixed dopants such as mineral acids/organic acids can also be utilized to impart desired electroactive character to the compositions of matter of this invention.

While p-doping is generally preferred, the compositions of matter according to this invention can be n-doped with conventional basic dopants including but not limited to Na, K, Li and Ca. Other suitable dopants include $I_2$, $PF_{6-}$, $SbF_{6-}$, and $FeCl_3$.

The compositions of matter of this invention are well suited for use in fabricating certain components of light emitting diodes (LEDs). LEDs typically possess numerous layers including a substrate, and indium tin oxide (ITO) anode, a hole injection layer, a hole transport layer, a light emitting layer, an electron transport layer, an electron injection layer and a cathode. The p-doped compositions of matter of this invention are particularly suited toward replacing the indium tin oxide anode of the LED. The p-doped compositions of matter of this invention are also particularly suited toward use as the hole injection layer of the LED. Undoped compositions of matter of this invention can be utilized in the hole transport layer, the light emitting layer and/or the electron transport layer of the LED.

Admixtures of the compositions of matter of this invention with other electroactive materials such as laser dyes, other electroactive polymers, hole transport or electron transport materials including electroactive organometallic compounds are also embodied in this invention.

Photovoltaic devices have specific similarities to LEDs. Instead of electrical voltage placed across the device to produce light for the LED device, the input of light (e.g. sunlight) produces a voltage difference across the device to produce an electric current. The layers of the LED and photovoltaic devices are similar but not equivalent. Light harvesting organics or polymers comprise an intermediate layer with hole transport/electron transport layers optionally placed between the anode and cathode. The compositions of matter of this invention can be utilized as the anode and hole injection layers (doped) or in the light harvesting layers (undoped).

The compositions of matter according to this invention can be utilized in fabricating electrochromic devices which permit or prevent the transmission of light through transparent substrates by application of a voltage across conventional substrates known in the art. Other uses for the compositions of matter according to the present invention include electromagnetic shielding and dimmable mirrors.

The doped compositions of matter according to this invention can be utilized as antistatic coatings applied from water-borne or organic solvent-borne solutions or dispersions to substrates enumerated under the definition section. Such antistatic coatings can include admixtures with other polymers including emulsions to achieve a balance of conductivity and film properties such as adhesion to the appropriate substrate. The compositions of matter of this invention can also be utilized as coatings or additives to various articles of commerce to render the article conductive including the various substrates noted above for antistatic coatings and electroplating processes, printable circuits, photoimageable circuits, semiconductor devices and the like.

While the preferred embodiment of this invention involves use of the compositions of matters as transparent/conductive materials, conductive nontransparent coatings based on the compostions of matter of this invention are also believed to have utility in specific applications where transparency is not important but electrical conductivity is important. Certain applications such as antistatic coatings may require pigmentation which will result in loss of transparency as well as various conductive paint applications. Printed circuits employing these materials will also generally not require transparency.

The compositions of matter of this invention can also be utilized to prepare optically transparent conductive coatings for use in optically transparent electrodes, transparent conductive adhesives, stealth coatings, transparent EMF shielding, touch screens, flat screen displays, flat antennas for mobile applications, transparent capacitor plates, and the like.

Additives such as ethylene glycol, diethylene glycol, mannitol, propylene 1,3-glycol, butane 1,4-glycol, N-methyl pyrrolidone, sorbitol, glycerol, propylene carbonate and other appropriate high boiling organics may be added to dispersions of the compositions of matter of this invention to improve conductivity.

Additional additives include conductive fillers such as particulate copper, silver, nickel, aluminum, carbon black and the like. Non-conductive fillers such as talc, mica, wollastonite, silica, clay, $TiO_2$, dyes, pigments and the like can also be added to the dispersions to promote specific properties such as increased modulus, surface hardness, surface color and the like.

The dispersions of the compositions of matter of this invention may also comprise antioxidants, UV stabilizers and surfactants when required for specific applications. Surfactants are typically added to the dispersions to control stability, surface tension, and surface wettability. Preferred surfactants include acetylenic diols. Viscosity modifiers (such as associative thickeners) can also be added to such dispersions to adjust viscosity for specific end uses.

The compositions of matter according to the present invention can be conveniently prepared by a variety of methods. The compositions of matter according to the present invention are preferably prepared utilizing an aqueous phase polymerization method wherein thieno[3,4-b] thiophene, a polyanion and an oxidant are reacted in the presence of water under reaction conditions sufficient to form poly(thieno[3,4-b]thiophene). The temperature for conducting the polymerization is not critical but affects the rate of polymerization.

Typical reaction conditions include temperatures ranging from 0° to about 50° C. The polymerization is continued for a period of time until the reaction in completed to effect the desired degree of polymerization. The degree of polymerization is not a critical element of this invention, but shall vary depending upon the end use application. The desired degree of polymerization shall depend upon the end use as is readily determined by one of ordinary skill in the art without undue experimentation. The polymerization time may range between a few minutes up to about 48 hours and depends on a number of factors including the size of the reactor utilized in the polymerization, the polymerization temperature and the oxidant utilized in the polymerization process.

The amount of polyanion and oxidant to be employed in the aqueous polymerization method may broadly vary and can be determined for any given polymerization without undue experimentation. For example the weight ratio of thieno[3,4-b]thiophene monomer to a desired polyanion typically ranges from 0.001 to 10, preferably 0.05 to 1.0. The weight ratio of thieno[3,4-b]thiophene monomer to a desired oxidant typically ranges from 0.01 to 10 preferably 0.1 to 2.0. In the case of ferric sulfate, the amount used ranges from 0.1 wt % to 5 wt % of thieno[3,4-b]thiophene.

Suitable polyanions include an anion of a polycarboxylic acid, such as polyacrylic acid, polymethacrylic acid, NAFION, a perfluorosulfonic acid polymer (NAFION is a registered trademark of E.I. DuPont de Nemours & Co., Wilmington, Del.), polymaleic acid, and polymeric sulfonic acids, such as polystyrene sulfonic acid and polyvinyl sulfonic acid. The polycarboxylic and polysulfonic acids may also be copolymers of vinyl carboxylic and vinyl sulfonic acids with other monomers, such as acrylates and styrene. The molecular weight of the acids supplying the polyanions is preferably in the range from 1,000 to 500,000, preferably from 2000 to 500,000 and most preferably about 70,000. The acids from which the polyanions are derived are commercially available or may be produced by known methods.

Suitable oxidants include iron (III) salts, such as $FeCl_3$, $Fe(ClO_4)_3$ and the iron (III) salts of organic acids and inorganic acids containing organic residues, $H_2O_2$, $K_2Cr_2O_7$, alkali or ammonium persulfates, alkali perborates, potassium permangate and copper salts such as copper tetrafluoroborate. In addition iodine, air and oxygen may advantageously be used as oxidants. Persulfates and the iron (III) salts of organic acids and inorganic acids containing organic residues are preferred because they are not corrosive.

Examples of iron (III) salts of organic acids are the Fe(III) salts of $C_{1-30}$ alkyl sulfonic acids, such as methane or dodecane sulfonic acid; aliphatic $C_{1-20}$ carboxylic acids, such as 2-ethylhexylcarboxylic acid, aliphatic perflurocarboxylic acids, such as trifluoroacetic acid and perfluorooctanoic acid; aliphatic dicarboxylic acids, such as oxalic acid and, aromatic, optionally $C_{1-20}$-alkyl-substituted sulfonic acids, such as benzenesulfonic acid, p-toluene-sulfonic acid and dodecyl benzenesulfonic acid and mixtures of the aforementioned Fe(III) salts of organic acids. Examples of iron (III) salts of inorganic acids containing organic residues are the iron (III) salts of sulfuric acid semiesters of $C_{1-20}$ alkanols, for example the Fe(III) salt of lauryl sulfate.

An alternate method according to this invention for preparing the polymers of this invention, most preferably, poly(thieno[3,4-b]thiophene), involves an electrochemical process wherein thieno[3,4-b]thiophene is polymerized in an electrochemical cell using a three electrode configuration. A suitable three electrode configuration comprises a button working electrode selected from the group consisting of platinum, gold and vitreous carbon button working electrodes, a platinum flag counter electrode and an Ag/Ag+ non-aqueous reference electrode. Suitable electrolytes are selected from the group consisting of tetrabutylammonium perchlorate/acetonitrile, lithium triflate/acetonitrile and tetrabutylammonium hexafluorophosphate/acetonitrile.

Thieno[3,4-b]thiophene undergoes electrochemical oxidation at a peak above 0.8V to provide the polymer, poly (thieno[3,4-b]thiophene) on the surface of the working electrode. The electrochemical oxidation is typically initiated at a potential of about 0.2V and is substantially completed at a potential of 0.4V. Upon completion of the polymerization, the polymer is removed from the working electrode by washing with a solvent such as acetonitrile.

Conventional electrolytic cells can be utilized to practice the electrochemical process for making the compositions of matter of the present invention. The preferred working electrode for making the compositions of matter of this invention is a vitreous carbon electrode and the preferred electrolyte is tetrabutylammonium perchlorate/acetonitrile.

Thieno[3,4-b]thiophene was also electrochemically polymerized in the presence of sodium poly(styrene sulfonate) using cyclovoltammetric polymerization. An onset for oxidation was observed at 0.82 V which corresponds to the potential at which polymerization ensues. Polymerization is evident as indicated by the increase in current response for the lower redox process which corresponds to the reduction and oxidation of the conducting polymer that had been electroprecipitated onto the electrode surface.

After electrochemical polymerization, the electrode was removed from the electrolyte, washed with brine and then placed into a 0.5M $NaCl/H_2O$ solution. The preferred oxidative polymerization of thieno[3,4-b]thiophene is carried out in aqueous solution utilizing poly(styrene sulfonic acid) as the polyanion and ammonium/persulfate and/or iron (III) sulfate as the chemical oxidant.

The polymerization has been described as a homopolymerization but it is also possible to conduct a copolymerization of the thieno[3,4-b]thiophene with another monomer such as 3,4-ethylenedioxythiophene or pyrrole.

III. Experimental

The following illustrative examples are provided to further describe how to make and use the compositions of matter and are not intended to limit the scope of the claimed invention. Unless otherwise states, parts and percentages in the examples are given by weight.

EXAMPLE 1

Synthesis of the Thieno [3,4-b]thiophene

All equipment was vacuum dried and argon purged before use. A 1000 ml round bottom, three-necked flask equipped with a thermometer was charged with 450 ml of dry diethyl ether and 34.4 g (133 mmol) of 3-bromo-4-(trimethylsilyl) ethynyl-thiophene. This solution was maintained at a temperature of −78° C. and stirred for an additional 30 minutes, after which, 58.6 ml of n-BuLi (2.4 M in hexane; 141 mmol) was slowly added drop-wise via syringe over a period of 1 hour while keeping the temperature of the solution below −75° C. After addition, the solution was stirred for 2 hours at −78° C. and then the solution was allowed to warm to about −45° C., which took approximately 1 hour to achieve.

The reaction mixture was allowed to stir for an additional hour while maintaining a temperature of −45° C. Sulfur, 4.5 g (141 mmol), was then added slowly over a ten minute period to the flask via a solids addition funnel and the reaction mixture was allowed to warm to about 35° C. in order to fully dissolve the sulfur. After approximately 10 minutes the initially cloudy solution that resulted immediately after sulfur addition had changed to clear and yellow. The reaction mixture was then cooled down to −45° C. and stirring was continued for an additional 2 hours. Then the reaction mixture was slowly warmed to −10° C. over a period of 30 minutes and 250 ml of the reaction mixture was then added to a 500 ml separatory funnel equipped with a cooling jacket containing a brine/ice mixture held at −5° C. The separatory funnel was first charged with 200 ml of brine and cooled to −5° C. before the extraction. During the extraction the aqueous layer changed to a cloudy yellow solution after 30 seconds.

After the first brine wash, the same process was then repeated for the second portion (250 ml) of the reaction mixture with a fresh brine solution (200 ml). The brine layers were then combined, placed in to a single neck 1000 ml round bottom flask under argon and this solution then heated up to 70° C. and stirred for 1 hour at this temperature. After cooling to room temperature, the product was extracted with ether (4×300 ml) and then the ether layers were combined, dried over $MgSO_4$ and evaporated under vacuum. The crude product (12.8 g) was purified using vacuum distillation with an 11.3 g (61%) thieno[3,4-b] thiophene fraction being collected from 38 to 45° C. at 0.05 torr as a colorless liquid.

EXAMPLE 2

Aqueous Synthesis of Poly(thieno[3,4-b]thiophene)

50 mg (0.36 mmol) of thieno[3,4-b]thiophene and 418 mg of 30% poly(styrenesulfonic acid) water solution in 9.8 ml of deionized water was added to a 25 ml 1-neck flask. 113.0 mg (0.48 mmol) of $(NH_4)_2S_2O_8$ and 0.9 mg of $Fe_2(SO_4)_3$ were added to the reaction flask. The oxidative polymerization was carried out in excess of one hour. After polymerization, the aqueous solution was purified by ion exchange columns (Amberlite IR-120 and IRA-900 from Arcos Organics) resulting in a deep green aqueous polythieno[3,4-b]thiophene/poly(styrene sulfonic acid) dispersion. Transparent films were prepared by spin coating the polythieno [3,4-b]thiophene/poly(styrene sulfonic acid) mixture onto glass substrates at 2,300 rpm yielding an electrically conductive surface. The bandgap of the polymer was measured as 1.8 eV.

EXAMPLE 3

Electrochemical Synthesis and Characterization of Poly(thieno[3,4-b]thiophene)

Thieno[3,4-b]thiophene was dissolved in tetrabutylammonium perchlorate/acetonitrile (TBAP/CAN) solution to a concentration of 10 mM monomer and was electrochemically polymerized employing a 3-electrode configuration, using a platinum button working electrode (2 mm diameter), platinum flag counter electrode (1 $cm^2$), and a Ag/Ag+ nonaqueous reference electrode (0.473 V versus standard hydrogen electrode as determined by calibration with a ferrocene solution. The monomer exhibits a low oxidation potential with an onset at 0.9V and a peak at 1.05 V. Polymerization was apparent from the current response increase in regular intervals at a lower redox potential upon repetitive scans.

Poly(thieno[3,4-b]thiophene) was prepared at a constant potential of 1.2 V on an indium tin oxide (ITO) coated glass plate, washed with acetonitrile and cyclic voltammetry was carried out in 0.1M TBAP/ACN. Upon scanning at a rate of 50 mV/s from −0.8V to 0.8V an onset for oxidation became apparent at −0.5 V with a half wave potential at about 0.2 V. On top of the broad redox process a sharp redox process was present at E½ of 0.3 V with 0.18 V peak-to-peak separation. This sharp redox process was not an artifact but was repeatable numerous times for thin films on both platinum and ITO.

Scan rate dependency was carried out at scan rates of 50, 100, 200 and 250 mV/s. The peak current for the reductive process of the polymer was found to scale linearly with the scan rate indicating that poly(thieno[3,4-b]thiophene) was adhered to the surface of the electrode.

An about 0.2 μm thick film of poly(thieno[3,4-b] thiophene), as measured by profilometry, was prepared at 1.0 V from a 10 mM monomer/0.1 M TBAP/ACN solution on an ITO coated glass slide. The polymer was reduced at −0.8V, dipped into 0.1 M TBAP/ACN containing 0.2% hydrazine by volume. The onset for the valence to conduction band occurs at 0.85 eV (1459 nm) with a peak at 1.54 eV (804 nm) qualifying this material as a low bandgap polymer. The polymer is deep blue in the insulating form and optically transparent in the p-doped state so that it is a potential cathodically coloring material for use in electrochromic devices. Initial chronocoulommetry procedures stepping the polymer between −0.8 V for 20 seconds and 0.6 V for 20 seconds, constituting a double potential step, on a platinum button show the polymer to have no calculable loss of electroactivity upon 200 double potential steps.

Cyclic voltammetry of the polymer was carried out in order to determine the n-doping properties of the polymer and in order to confirm the bandgap. Cyclic voltammetry of poly(thieno[3,4-b]thiophene) was obtained using a platinum button working electrode, platinum plate counter electrode, and Ag/Ag+ nonaqueous reference electrode in 0.1 M TBAP/ACN. Sodium hydride was placed in the electrolyte solution in order to ensure the absence of water. The procedure was initiated at a potential of −0.9 V, scanned anodically to 0.6 V, then cathodically toward −1.8V and then anodically to −0.4 V. The p-doping process for the polymer occurs at an onset potential of −0.4 V and peaks at a potential of 0.15 V. The n-doping process ensues with an onset at about −1.05 V and gives two peaks at potentials of −1.3 V and −1.5 V. The difference between the onsets of the p-doping process and the first n-doping process is calculated to be 0.75 eV. The n-doping redox process of the polymer was found to retain 50% electroactivity, as determined by the integration for the n-doping redox process, after the tenth cyclic voltammogram.

The p-doping redox process only becomes intense if the polymer is first cycled through the n-doped state. For instance, without having been subjected to the n-doped state, the polymer peak potential for the oxidative p-doping process occurs at 0.4 V. The first scan after having subjected the polymer to the n-doped state intensifies the current and shifts the p-doping process to a lower potential of about 0.05 V. The polymer oxidation then shifts to a higher potential of 0.15 V upon subjection to a second n-doping process and then becomes stabilized at 0.35 V after having subjected it a third and subsequent times to the n-doping process.

The polymer is deep blue in the insulating form and transmissive tan in the p-doped state making it a potential cathodically coloring material for use in electrochromic devices. Initial chronocoulommetry stepping the polymer between −0.8 V for 20 seconds and 0.6V for 20 seconds, (this constitutes a double potential step) were carried out on a platinum button. The polymer was found to have no calculable loss of electroactivity upon 200 double potential steps. The chronocoulommetry results for an about 1 micron thick film on indium tin oxide coated glass were determined with the polymer being switched between −0.8 V and 0.6 V in 0.1 M TBAP/ACN with a pulse length of twenty seconds. It took approximately four seconds for the polymer to switch to the oxidized state and approximately two seconds to switch to the fully reduced state.

EXAMPLE 4

Copolymerization of Thieno[3,4-b]thiophene and 3,4-ethylenedioxthiophene.

A copolymer of thieno[3,4-b]thiophene and 3,4-ethylenedioxthiophene was prepared according to the procedure set forth in Example 3 except that a solution was prepared consisting of 5 mM thieno[3,4-b]thiophene and 5 mM ethylenedioxythiophene in 0.1 M tetrabutylammonium hexafluorophosphate (TBAPF$_6$)/ACN. Polymerization was evidenced by the increase in current of the lower redox process upon sequential scanning. The structure of the copolymer was confirmed by conventional analytical techniques.

In addition to polymerizing thieno[3,4-b]thiophene and copolymerizing the same with 3,4-ethylenedioxythiophene, thieno[3,4-b]thiophene was used as a crosslinking agent for the polymerization of 3-octylthiophene using the same general synthesis as set out above.

The essential characteristics of the present invention are described completely in the foregoing disclosure. One skilled in the art can understand the invention and make various modifications without departing from the basic spirit of the invention, and without deviating from the scope and equivalents of the claims which follow.

We claim:

1. A substrate having polymerized thieno[3,4-b]thiophene deposited thereon.

2. The substrate of claim 1, wherein the substrate comprises at least one member selected from the group consisting of glass, organic polymers, indium tin oxide, plastic, silicon, minerals, semiconducting materials, ceramics, and metals.

3. The substrate of claim 2, wherein the substrate comprises indium tin oxide.

4. The substrate of claim 1, wherein the polymerized thieno[3,4-b]thiophene further comprises polymerized units selected from the group consisting of an electroactive monomer, a non-electroactive monomer, and a combination thereof.

5. The substrate of claim 4, wherein the electroactive monomer is selected from the group consisting of thiophene, substituted thiophenes, substituted thieno[3,4-b]thiophenes, dithieno[3,4-b:3',4'-d]thiophene, pyrrole, bithiophene, substituted pyrroles, phenylene, substituted phenylenes, naphthalene, substituted naphthalenes, biphenyl, terphenyl, substituted terphenyl, phenylene vinylene, and substituted phenylene vinylene.

6. The substrate of claim 4, wherein the electroactive monomer is selected from the group consisting of
a substituted thieno[3,4-b]-thiophene represented by the formula:

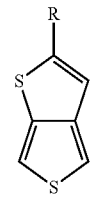

wherein R is a $C_1$ to $C_{12}$ primary, secondary or tertiary alkyl group, phenyl, substituted phenyl, cyclohexyl, naphthalenic, hydroxyl, alkyl ether, carboxylic acid, carboxylic ester, or a sulfonic acid;
a substituted thiophene represented by the formula:

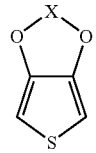

wherein x is a substituted $C_1$-$C_4$ alkylene group, a $C_1$-$C_{12}$ alkyl or phenyl substituted 1,2 ethylene radical, or a 1,2 cyclohexylene radical; and
a substituted thiophene represented by the formula:

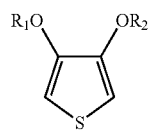

wherein $R_1$ and $R_2$ are independently H, $C_1$-$C_4$ alkyl groups, 1,2 cyclohexylene radical, phenyl, or substituted phenyl.

7. A dispersion comprising poly(thieno[3,4-b]thiophene), water, and at least one solvent.

8. The dispersion of claim 7, wherein the poly(thieno[3,4-b]thiophene) further comprises polymerized units selected from the group consisting of an electroactive monomer, a non-electroactive monomer, and a combination thereof.

9. The dispersion of claim 8, wherein the electroactive monomer is selected from the group consisting of thiophene, substituted thiophenes, substituted thieno[3,4-b]thiophenes, dithieno[3,4-b:3',4'-d]thiophene, pyrrole, bithiophene, substituted pyrroles, phenylene, substituted phenylenes, naphthalene, substituted naphthalenes, biphenyl, terphenyl, substituted terphenyl, phenylene vinylene, and substituted phenylene vinylene.

10. The dispersion of claim 8, wherein the electroactive monomer is selected from the group consisting of
a substituted thieno[3,4-b]-thiophene represented by the formula:

wherein R is a $C_1$ to $C_{12}$ primary, secondary or tertiary alkyl group, phenyl, substituted phenyl, cyclohexyl, naphthalenic, hydroxyl, alkyl ether, carboxylic acid, carboxylic ester, or a sulfonic acid;

a substituted thiophene represented by the formula:

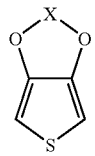

wherein x is a substituted $C_1$-$C_4$ alkylene group, a $C_1$-$C_{12}$ alkyl or phenyl substituted 1,2 ethylene radical, or a 1,2 cyclohexylene radical; and a substituted thiophene represented by the formula:

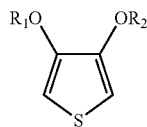

wherein $R_1$ and $R_2$ are independently H, $C_1$-$C_4$ alkyl groups, 1,2 cyclohexylene radical, phenyl, or substituted phenyl.

11. The dispersion of claim 7, wherein the dispersion further comprises poly(styrene sulfonic acid).

12. The dispersion of claim 7, further comprising at least one dopant.

13. The dispersion of claim 12, wherein the dopant comprises at least one member selected from the group consisting of Na, K, Li, Ca, $PF_6$, $SbF_6$, and $FeCl_3$.

14. The dispersion of claim 13, wherein the dopant comprises $FeCl_3$.

15. The dispersion of claim 7, further comprising at least one member selected from the group consisting of HCl, $HNO_3$, $H_2SO_4$, $H_3PO_4$, HBr, HI, organic sulfonic acids, organic acid dyes, methane sulfonic acid, toluene sulfonic acid, polymeric sulfonic acids, carboxylic acids, and polycarboxylic acids.

16. The dispersion of claim 15, wherein the member comprises organic sulfonic acids.

17. The dispersion of claim 15, wherein the member comprises polycarboxylic acids.

18. The dispersion of claim 7, wherein the dispersion further comprises at least one emulsion.

19. The dispersion of claim 7, further comprising at least one additive selected from the group consisting of ethylene glycol, diethylene glycol, mannitol, propylene 1,3-glycol, butane 1,4-glycol, N-methyl pyrrolidone, sorbitol, glycerol, and propylene carbonate.

20. The dispersion of claim 7, further comprising at least one conductive filler.

21. The dispersion of claim 20, wherein the conductive filler comprises at least one member selected from the group consisting of copper, silver, nickel, aluminum, and carbon.

22. The dispersion of claim 20, wherein the conductive filler comprises carbon.

23. The dispersion of claim 7, further comprising at least one non-conductive filler.

24. The dispersion of claim 23, wherein the non-conductive filler comprises at least one member selected from the group consisting of talc, mica, wollastonite, silica, clay, $TiO_2$, dyes, and pigments.

25. The dispersion of claim 7, further comprising at least one member selected from the group consisting of antioxidants, surfactants, and UV stabilizers.

26. The dispersion of claim 25, wherein the dispersion further comprises at least one surfactant.

27. The dispersion of claim 26, wherein the surfactant comprises acetylenic diols.

28. The dispersion of claim 7, further comprising at least one member selected from the group consisting of polyacrylic acid, polymethacrylic acid, polymaleic acid, polystyrene sulfonic acid, a perfluorosulfonic acid polymer, and polyvinyl sulfonic acid.

29. The dispersion of 28, wherein the member comprises a perfluorosulfonic acid polymer.

30. The dispersion of claim 28, wherein the member comprises polysulfonic acid.

31. The dispersion of claim 7, further comprising at least one acid having a molecular weight from 2,000 to 70,000.

32. The dispersion of claim 7, wherein the dispersion can be applied to a substrate using ink jet printing, screen printing, roll to roll printing, spin coating, meniscus coating, dip coating, spray coating, brush coating, doctor blade coating, or curtain casting.

* * * * *